(12) United States Patent
Harrison (10) Patent No.: US 9,048,663 B2
(45) Date of Patent: Jun. 2, 2015

(54) ELECTRICAL ENERGY DISTRIBUTION SYSTEM WITH RIDE-THROUGH CAPABILITY

(75) Inventor: Craig Harrison, Tomago (AU)

(73) Assignee: RENERGYX PTY LIMITED, Tomago, NSW (AU)

( * ) Notice: Subject to any disclaimer, the term of this patent is extended or adjusted under 35 U.S.C. 154(b) by 539 days.

(21) Appl. No.: 13/388,261

(22) PCT Filed: Aug. 19, 2010

(86) PCT No.: PCT/AU2010/001061
§ 371 (c)(1),
(2), (4) Date: Mar. 1, 2012

(87) PCT Pub. No.: WO2011/020149
PCT Pub. Date: Feb. 24, 2011

(65) Prior Publication Data
US 2012/0146412 A1      Jun. 14, 2012

(30) Foreign Application Priority Data

Aug. 21, 2009 (AU) ................................ 2009904038

(51) Int. Cl.
*H02J 3/32* (2006.01)
*H02J 4/00* (2006.01)
*H02J 3/02* (2006.01)

(52) U.S. Cl.
CPC ... *H02J 4/00* (2013.01); *H02J 3/32* (2013.01); *H02J 3/02* (2013.01)

(58) Field of Classification Search
CPC ...................................... H02J 3/32; H02J 7/34

USPC ...................................................... 307/12, 36
See application file for complete search history.

(56) References Cited

U.S. PATENT DOCUMENTS

| 7,012,825 | B2 * | 3/2006 | Nielsen ......................... 363/142 |
| 7,939,968 | B2 * | 5/2011 | Hjort et al. ...................... 307/66 |
| 2004/0155527 | A1 | 8/2004 | Bryde |
| 2006/0043793 | A1 * | 3/2006 | Hjort et al. ........................ 307/1 |
| 2006/0097578 | A1 | 5/2006 | Baldwin et al. |

FOREIGN PATENT DOCUMENTS

| EP | 2 058 921 | 5/2009 |
| GB | 2 455 334 | 6/2009 |
| WO | WO 2008/088755 | 7/2008 |
| WO | WO 2008/145191 | 12/2008 |
| WO | WO 2009/062227 | 5/2009 |

OTHER PUBLICATIONS

PCT International Search Report and Written Opinion of the Searching Authority, PCT/AU2010/001061 filed Aug. 19, 2010, Australian Searching Authority, Nov. 4, 2010, 8 pages.

* cited by examiner

*Primary Examiner* — Adi Amrany (57) ABSTRACT

This invention concerns an electrical energy distribution system. The system incorporates 'ride-through' capability, comprising: a supply side for supplying energy in the form of direct current at a supply voltage, a delivery side for delivering energy, having plural connection ports for selective connection to respective electrical energy loads. Wherein each connection port includes electricity conditioning circuitry to deliver and vary electrical power supply to a load connected at the port. And further comprising a bank of charge storage devices arranged in series and connected across the supply voltage.

3 Claims, 9 Drawing Sheets

ELECTRICAL ENERGY DISTRIBUTION SYSTEM WITH RIDE-THROUGH CAPABILITY

TECHNICAL FIELD

This invention concerns an electrical energy distribution system.

BACKGROUND ART

Industrialised countries are heavily dependent on large centralised electricity generation plants to produce power. For example, 80% of the electricity generated in Australia is produced by coal power plants. These power plants are usually built away from the cities where the power is consumed.

In addition, secondary energy sources are becoming increasingly important. Common renewable energy sources include photovoltaic (PV) solar cells, wind turbine generators, wave turbine generators and tidal turbine generators. These sources can be connected to deliver electrical energy to the standard 50 Hz AC power distribution grid by means of AC inverter systems designed to synchronize with the power grid.

Because the secondary sources are intermittent and deliver fluctuating amounts of energy, connection to the power grid invariably requires some energy storage for 'ride through', with an energy delivery time frame in the order of seconds to days. Examples of storage systems include: high capacity batteries (electrical "flow batteries"), solar "molten salt", solar hot water, and solar generated biogas where electrical energy is generated in a secondary process such as steam turbine generators. These schemes are relatively expensive and are only economically viable on large scale electrical power systems.

Figure 1:
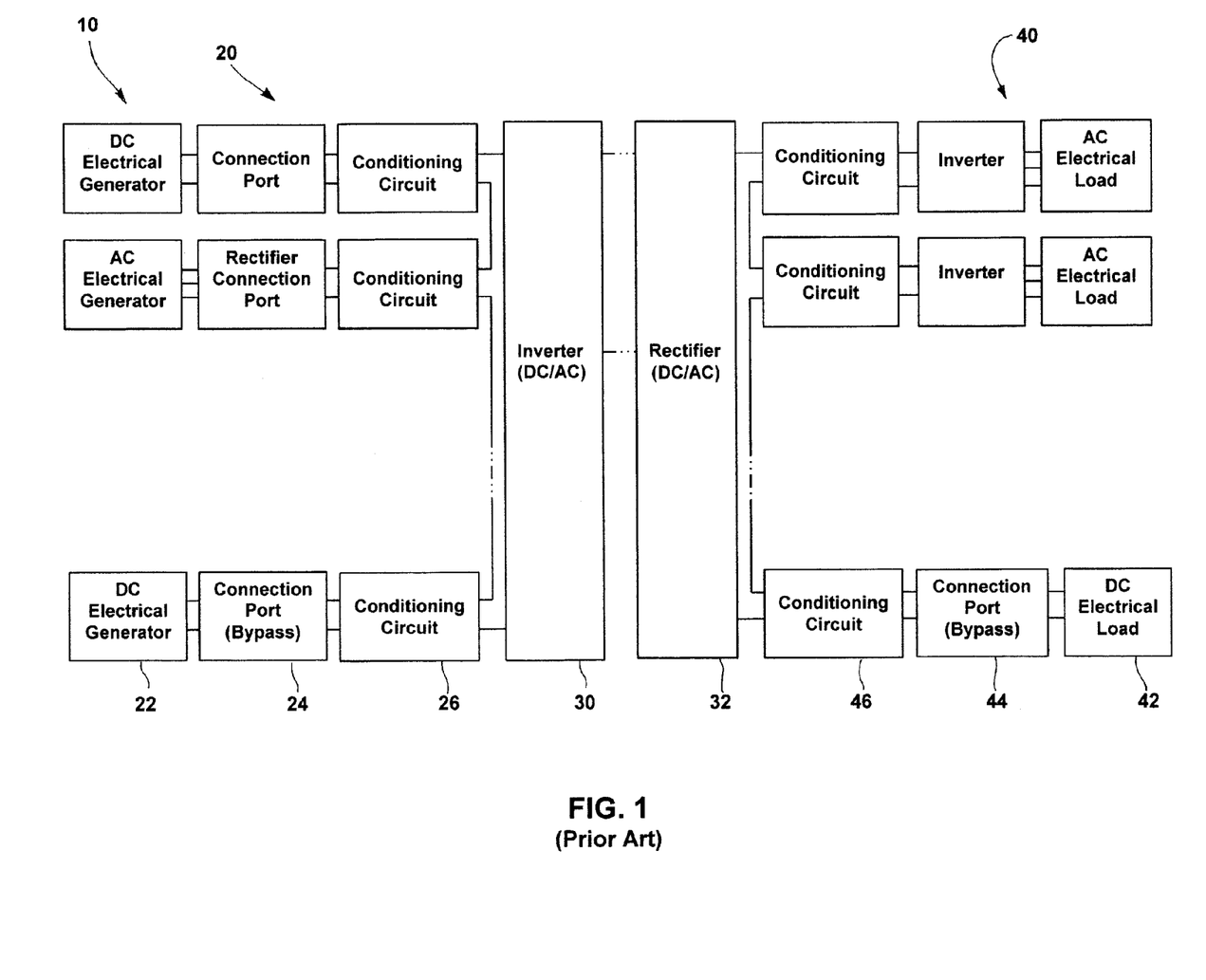

Referring now to FIG. 1, a typical electrical energy supply and distribution system 10, as described in our earlier patent application WO 2009/062227, comprises a supply side 20 where multiple electrical energy generators 22 are connected via connection ports 24, involving conditioning circuits 26, into a single DC electrical energy source. This energy source is supplied to a common inverter system 30 to convert it to AC for transmission on over a power grid, or other load. A rectifier 32 takes the AC power from the grid and delivers it to AC and DC loads. On the delivery side 40 energy is delivered to multiple loads 42 via connection ports 44 involving conditioning circuits 46 and other conditioning circuitry 48.

In this system the electrical energy generators 22 are connected in a series DC loop. Electrical circuit theory dictates that the current in each part of the series DC loop is the same but the voltage developed by each generator is added together. The power delivered is therefore the product of the total voltage and the loop current.

The electrical energy generators 22 include, but are not limited to: wind turbines; photovoltaic solar cells; storage batteries; ignition engine generator sets; diesel power generators; gas turbines; steam turbines; an asynchronous induction type generator and, a reticulated supply. For example, these energy source may generate powers of up to 100 kWs or MWs, and this is understood to be 'medium scale'.

SUMMARY OF THE INVENTION

The invention is an electrical energy distribution system incorporating 'ride-through' capability, comprising:

A supply side for supplying energy in the form of direct current at a supply voltage.

A delivery side for delivering energy, having plural connection ports for selective connection to respective electrical energy loads. Wherein each connection port includes electricity conditioning circuitry to deliver and vary electrical power supply to a load connected at the port.

And further comprising a bank of charge storage devices arranged in series and connected across the supply voltage.

The charge storage devices may be of any conceivable kind; the most common being capacitors and batteries. In use they are charged so that charge is able to be sourced or absorbed to smooth the supply to the electrical loads in the event of fluctuations in supply side energy; and so provide 'ride-through' for these events. Fluctuations in the supply side energy may arise from the natural fluctuations of a renewable energy source, or the slow response of diesel generator systems. In any event the invention provides dynamic stability to electrically 'soft' distribution grids. For instance, in islanded systems or larger grid connected system with poor transmission line feed.

As well as providing 'ride-through' the charge storage devices may be used to balance reactive power at the point of delivery. For instance, and long overhead transmission line behaves like an inductance and can reduce the real power available at the point of delivery. Charge movement to or from the charge storage devices can be used to behave like a capacitance and balance the effect of the transmission line. The opposite effect may also be compensated, for instance when underground transmission lines are used which develop capacitance. In any event the invention may be used to provide balanced reactive power at the point of delivery.

The charge storage devices may be charged in a variety of ways, including: charging from the load side, for instance tapping across the output of load side conditioning circuitry. Or, charging from an auxiliary AC or DC supply.

Additional charge storage devices may be incorporated after the conditioning circuitry in one or more of the output arms. In this case the devices may be charged by tapping across the output of load side conditioning circuitry. A charging controller may also be arranged across the output of the load side conditioning circuitry to ensure proper charging. A diode or switch may be used by the controller for this purpose.

These charge storage devices may also be charged in a variety of ways, including: Charging from the load side, for instance tapping across the output of load side conditioning circuitry. Or, charging from an auxiliary AC or DC supply.

BRIEF DESCRIPTION OF DRAWINGS

The prior art has been described above with reference to FIG. 1 which is a block diagram of an electrical energy supply and distribution system.

An example of the invention will now be described with reference to the accompanying drawings, in which.

BEST MODES OF THE INVENTION

Figure 2:
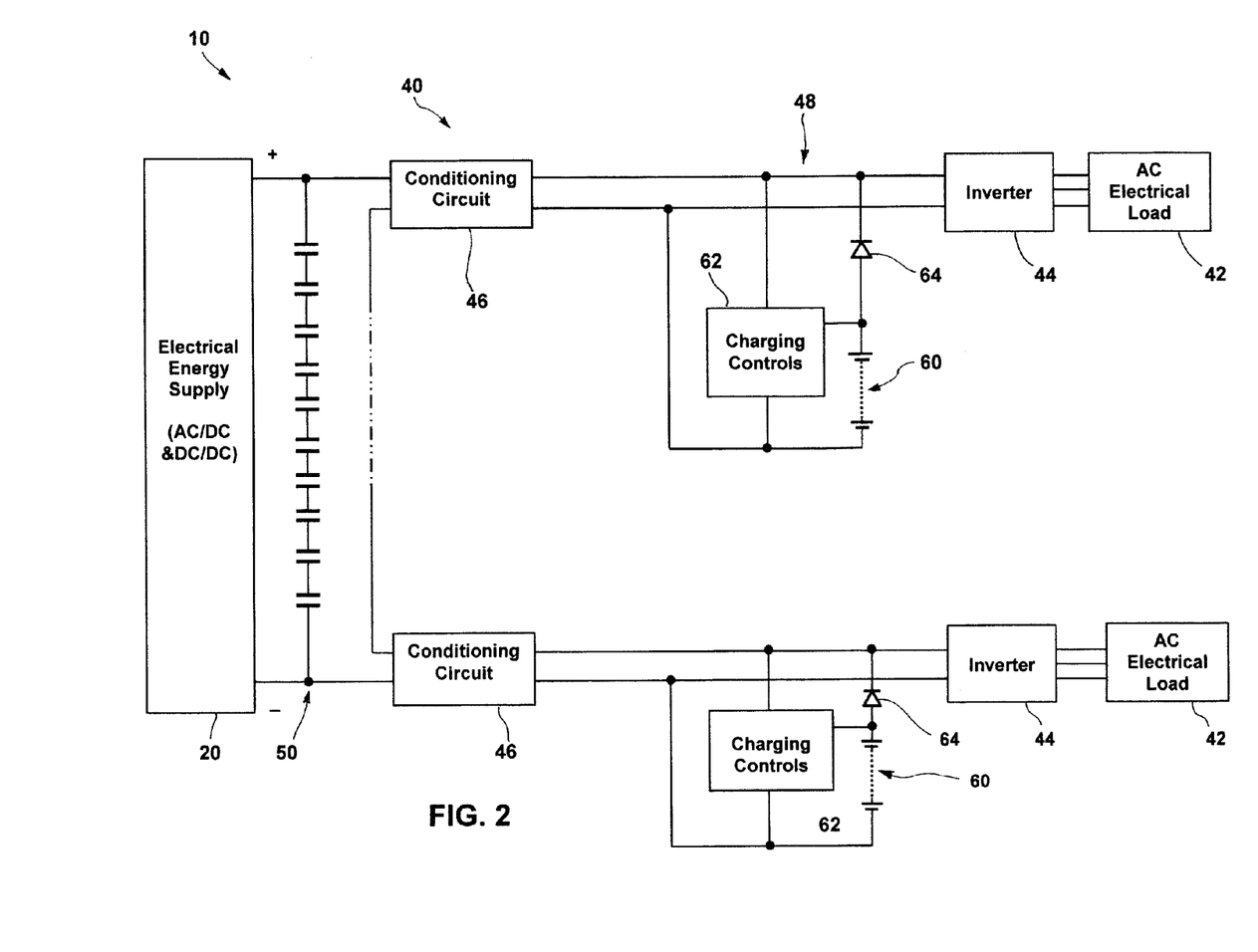
FIG. 2 is a block diagram of a general electrical energy storage and recovery system with ride-through capability.

Referring to FIG. 2, energy supply and distribution system 10 comprises a supply side similar to that of FIG. 1, and the entire supply side together with a rectifier are all indicated in one block 20/32. The high voltage delivery side 40 is shown in greater detail, and delivers DC energy to multiple loads 42 via respective connection ports 44. The connection ports 44 involve inverters when alternating current (AC) loads are to be driven. Conditioning circuits 46 precede the connection ports. A two wire DC link 48 connects the outputs of the conditioning circuits 46 to the inputs of the connection ports 44. In the context of the series DC loop, DC flows forward along the upper wire of the link 48 and back along the lower wire.

Plural capacitors are arranged in series to form a capacitor bank 50 which is connected across the supply 32. This bank of capacitors is charged from the supply side 20 after connection. In a typical system the delivery side will provide a supply of 3 kV DC, and there may be four 10 Farad capacitors each developing 750 Volts in the bank 50 that is connected across the supply.

A bank of energy storage batteries are also arranged in series, and such a bank 60 is connected across the two wires of each DC link between conditioning circuit 46 and connection port 44. The storage batteries are charged from the DC link under the control of a charging controller 62 that is also connected across the DC link. A diode 64 is shown to control charging.

In the event of any faltering in the supply side that results in a drop in the voltage applied to the connection ports 44, and therefore the load, both banks of capacitors 50 and storage batteries 60 operate together to maintain the level of the supply to the connection port 44. This enables the inverters 44 and loads 42 to 'ride-through' the interruption. For example the banks 50 and 60 may be able to provide 200 to 250 kW for 17 to 20 seconds; which is sufficient for a genset to cold start, synchronise and pick up load. The operational voltage deviation of the 'ride through' may be less than 4%, and the operational frequency deviation less than 10%. After ride-through the banks 50 and 60 will recharge rapidly.

Figure 3:
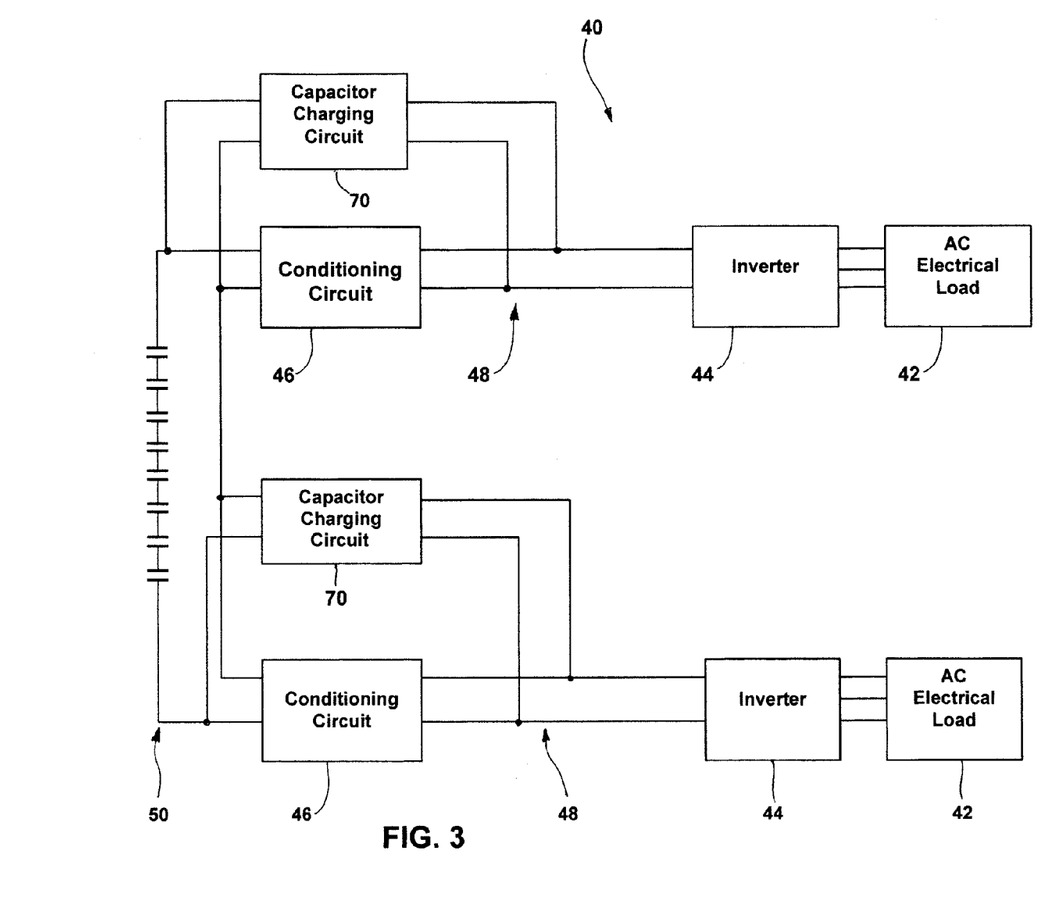
FIG. 3 is a block diagram of an electrical energy storage and recovery system with load side charging of the ride-through capability.

Since the supply may not be able to recharge the banks 50 and 60 sufficiently rapidly, a number of alternative arrangements are envisaged:

Referring to FIG. 3 an arrangement for charging the capacitor bank 50 from the load side will be described. In this case a charging circuit 70 is connected across each DC link 48 to charge respective parts of the series bank of capacitors 50. Energy stored in the capacitors 50 is drawn by the DC link 48 via the conditioning circuit 46. Energy is delivered to the load 42 via the inverter 44.

Figure 4:
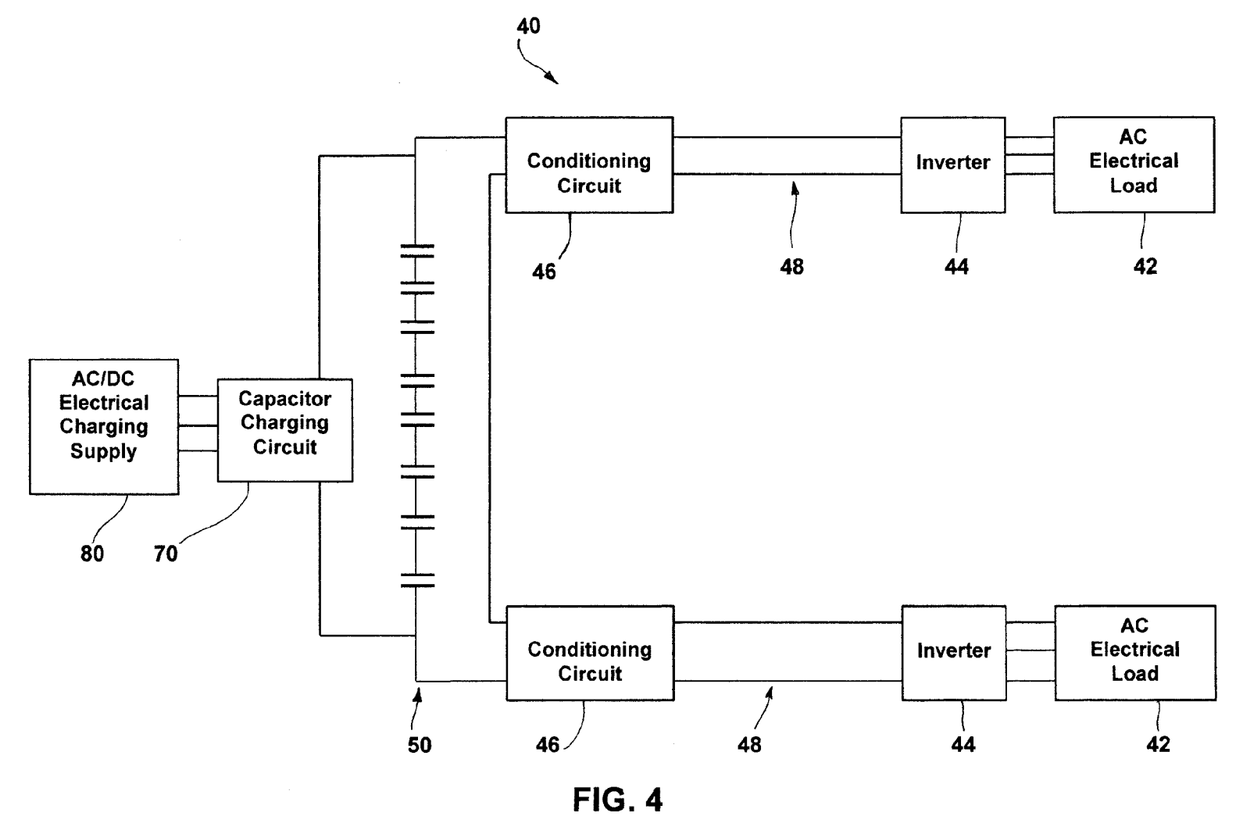
FIG. 4 is a block diagram of an electrical energy storage and recovery system using capacitors for storage combined with a charging system supplied by a separate AC or DC energy supply system.

FIG. 4 shows an arrangement for charging the capacitor bank 50 from an auxiliary AC or DC supply 80. In this case the charging circuit 70, which controls the rate of charging, is connected directly to the auxiliary supply 80 and across the entire bank of capacitors 50. When required, energy stored in the capacitors 50 is drawn by the DC link 48 via the conditioning circuit 46.

Figure 5:
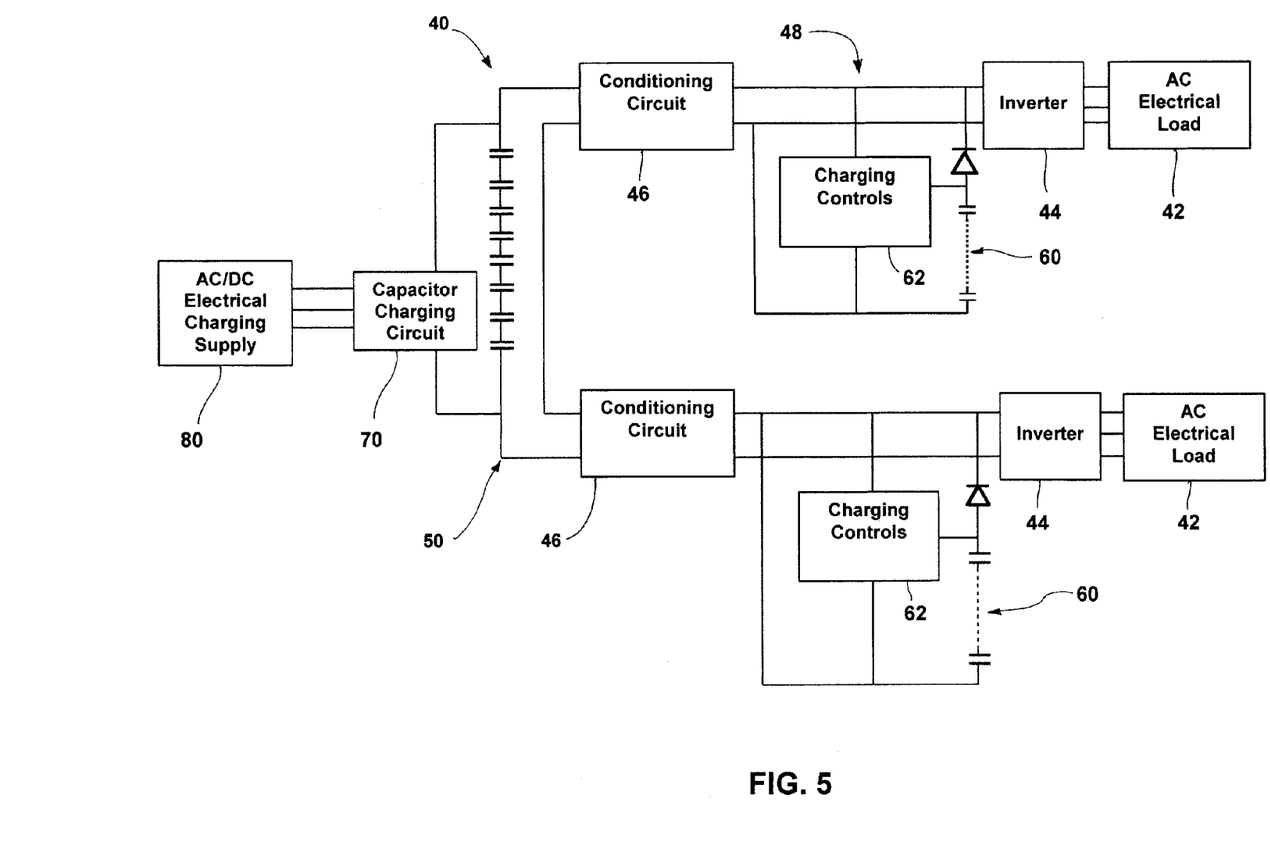
FIG. 5 is a block diagram of an electrical energy storage and recovery system using capacitors and batteries for storage combined with a charging system supplied by a separate AC or DC energy supply system.

FIG. 5 shows an arrangement for charging both the capacitor bank 50 and the banks of energy storage batteries 60 from an auxiliary AC or DC supply 80. In this case the charging circuit 70, which controls the rate of charging, is connected directly to the auxiliary supply 80 and across the entire bank of capacitors 50. The banks of charge storage devices 60 are recharged from the auxiliary supply 80 via the DC link 48. When required, energy stored in the capacitors 50 is drawn by the DC link 48 via the conditioning circuit 46.

Figure 6:
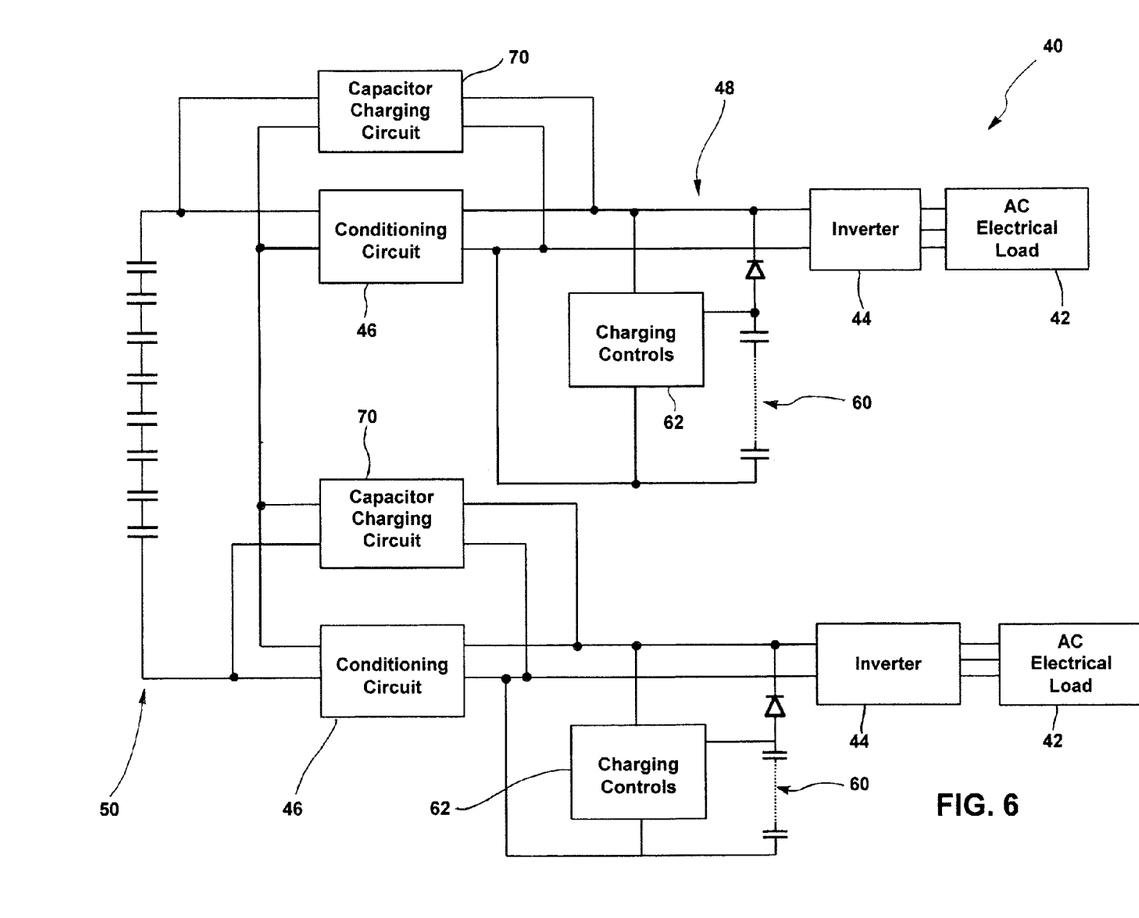
FIG. 6 is a block diagram of an electrical energy storage and recovery system using capacitors and batteries for storage combined with a charging system supplied by an electrical load or distribution system.

FIG. 6 shows an arrangement for charging both the capacitor bank 50 and the banks of energy storage batteries 60 from the load side. In this case a charging circuit 70 is connected across each DC link 48 to charge respective parts of the series bank of capacitors 50. The banks of charge storage devices 60 are charged from the DC link 48 under the control of a charging controller 62; that is also connected across the DC link. A diode 64 is shown to control charging. In normal operation energy is delivered to the load 42 via the inverter 44. When required, energy stored in the capacitors 50 is drawn by the DC link 48 via the conditioning circuit 46, and energy stored in the batteries is drawn by the DC link 30 via the diode (or switch) 33 connected to the DC bus 30.

Figure 7:
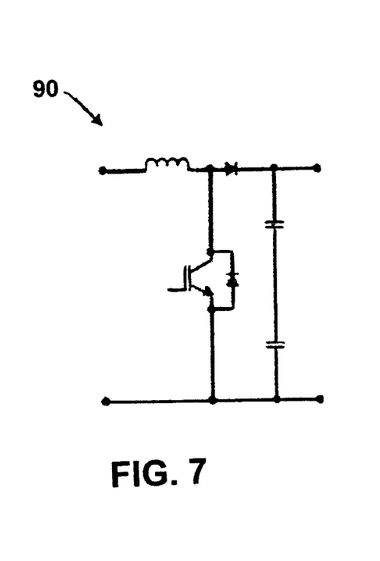
FIG. 7 is a circuit diagram of a conditioning circuit 6 using a boost regulator.

FIG. 7 shows a boost regulator conditioning circuit 90. The conditioning circuit maintains a regulated voltage at the DC link 48 for correct operation of the inverter 44 system. Other switching regulators such as buck, buck-boost, push-pull and bridge-type regulators may be used.

Figure 8:
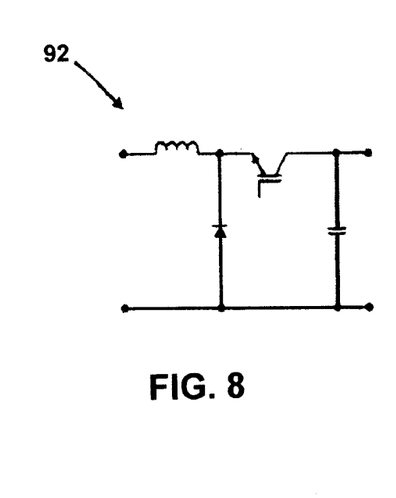
FIG. 8 is a circuit diagram of a charging circuit 8 using a down or buck regulator.

FIG. 8 shows a charge control circuit 92. Other switching regulators such as buck, buck-boost, push-pull and bridge-type regulators may be used.

Figure 9:
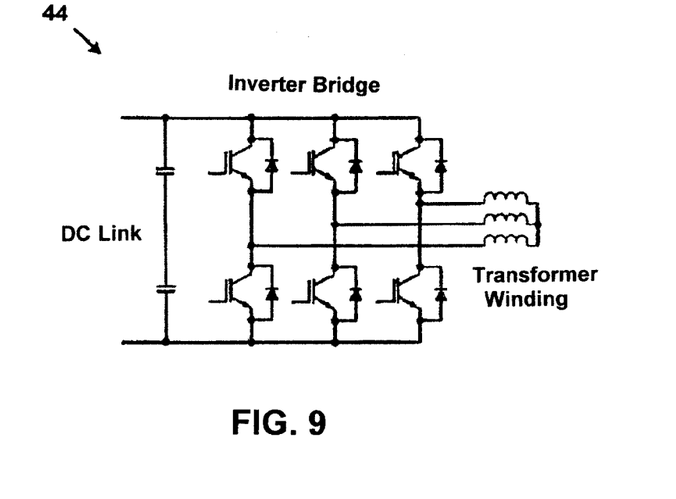
FIG. 9. is a circuit diagram of a inverter circuit.

FIG. 9 shows a IGBT bridge inverter 44 system. Other inverter configurations and switches may be used to deliver single or multiphase AC outputs.

Figure 10:
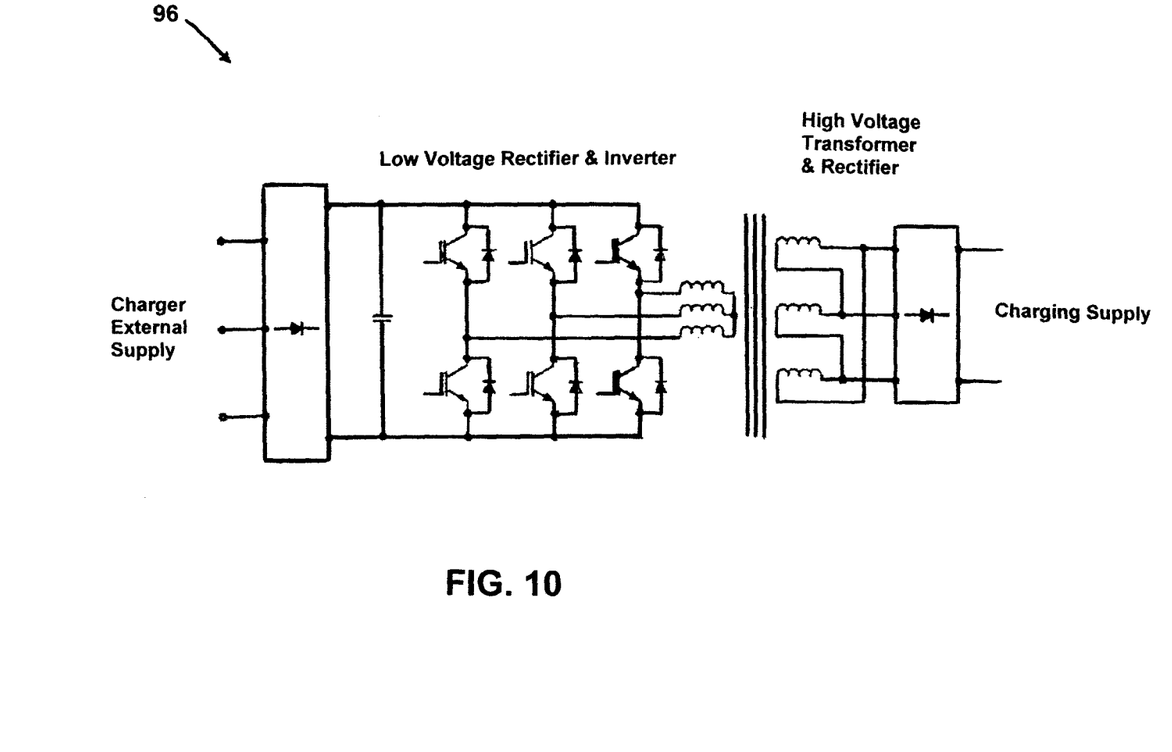
FIG. 10 is a circuit diagram of a charging control circuit.

FIG. 10 shows an auxiliary charging control circuit 96.

It will be appreciated by persons skilled in the art that numerous variations and modifications may be made to the invention as shown in the specific embodiments without departing from the spirit or scope of the invention as broadly described. For instance anywhere a capacitor has been shown, it could be replace with a charge storage device; and vice versa. Also where on device has been shown it could be made up of many other devices.

The invention claimed is:

1. An electrical energy distribution system incorporating 'ride-through' capability, comprising:
   a supply side for supplying energy in the form of direct current at a supply voltage;
   a delivery side for delivering energy, having plural connection ports connected in series across the supply voltage for selective connection to respective electrical energy loads, wherein each connection port includes electricity conditioning circuitry to supply DC power over a DC link to an inverter connected to the DC link to deliver AC power to a load connected at the port and a bank of batteries incorporated after the conditioning circuitry across the DC link and to be charged by tapping across the DC link; and a bank of capacitors connected across the supply voltage, wherein the capacitors are charged from the load side, by tapping across the DC link of one or more of the plural connection ports.

2. An electrical energy distribution system according to claim 1, wherein a charging controller is arranged across the DC link to ensure charging.

3. An electrical energy distribution system according to claim 2, wherein a diode or switch is used by the charging controller to ensure charging.

* * * * *